(12) United States Patent
Park et al.

(10) Patent No.: US 7,781,563 B2
(45) Date of Patent: Aug. 24, 2010

(54) PREPARING METHOD OF METHOXYPOLYETHYLENEGLYCOL AND ITS DERIVATIVES

(75) Inventors: Pyeong-Uk Park, Ulsan (KR); Seong-Neon Kim, Ulsan (KR); Chong-Gu Lee, Ulsan (KR); Ju-Sung Lee, Ulsan (KR)

(73) Assignee: ID Biochem, Inc., Ulsan (KR)

( * ) Notice: Subject to any disclaimer, the term of this patent is extended or adjusted under 35 U.S.C. 154(b) by 560 days.

(21) Appl. No.: 11/663,863

(22) PCT Filed: Aug. 3, 2006

(86) PCT No.: PCT/KR2006/003059

§ 371 (c)(1),
(2), (4) Date: Mar. 27, 2007

(87) PCT Pub. No.: WO2007/024066

PCT Pub. Date: Mar. 1, 2007

(65) Prior Publication Data

US 2008/0090991 A1 Apr. 17, 2008

(30) Foreign Application Priority Data

Aug. 26, 2005 (KR) .................... 10-2005-0078619

(51) Int. Cl.
*C07C 69/80* (2006.01)
*C07C 41/01* (2006.01)
*C07C 43/11* (2006.01)
*C07C 67/08* (2006.01)
*C08G 65/34* (2006.01)
*C08G 65/48* (2006.01)
*C08G 65/30* (2006.01)

(52) U.S. Cl. .................... 528/361; 568/606; 568/607; 528/482; 528/489

(58) Field of Classification Search ................ 528/361, 528/366

See application file for complete search history.

(56) References Cited

U.S. PATENT DOCUMENTS

| 5,932,462 A | 8/1999 | Harris et al. |
| 6,239,252 B1 | 5/2001 | Lele et al. |
| 2004/0225097 A1 | 11/2004 | Nho et al. |

FOREIGN PATENT DOCUMENTS

| EP | 0 497 404 | 8/1992 |

OTHER PUBLICATIONS

Hinde et al, Kinetics and Mechanism of the formation of mono- and di-phthalate esters catalysed by titanium and tin alkoxides, J. Chem. Soc. Perkin Trans 2 1998, p. 1249-1256.*

Harris, J.M. "Laboratory Synthesis of Polyethylene Glycol Derivatives" Journal of Macromolecular Science—Reviews in Macromoleculararchemistry, Marcel Dekker Journals, New York, vol. C-25, No. 3, pp. 325-373 (1985).

* cited by examiner

*Primary Examiner*—Randy Gulakowski
*Assistant Examiner*—Rachel Kahn
(74) *Attorney, Agent, or Firm*—Henry D. Coleman; R. Neil Sudol; William J. Sapone

(57) ABSTRACT

The present invention relates to a preparing method of methoxypolyethyleneglycol (mPEG) with high purity and derivatives thereof. More precisely, the method of the present invention to prepare high purity mPEG with at least 99% of purity, up to 1.05 of molecular weight distribution and 350~100,000 of molecular weight includes the process of reacting commercial mPEG having low purity to give highly purified intermediates, mPEG-acetic acid of formula 1 and mPEG-phthalate of formula 2.

6 Claims, No Drawings

PREPARING METHOD OF METHOXYPOLYETHYLENEGLYCOL AND ITS DERIVATIVES

TECHNICAL FIELD

The present invention relates to a preparing method of methoxypolyethyleneglycol (referred as 'mPEG' hereinafter) with high purity and derivatives thereof.

BACKGROUND ART

PEG has been known as one of the most representative hydrophilic polymers, including natural polymers and synthetic polymers, forming hydrogen bond with water molecule.

PEG is soluble in various organic solvents and exhibits almost no toxicity in human. PEG presents a fully extended structure form in water, so that it can be used to reduce toxicity of medicinal molecules and protect the administered composition from being destroyed by immune system based on the structured steric hinderance by conjugation with other medicinal factors (protein, peptide, enzyme, gene, etc). Thus, PEG can be applied to various medicines to extend their half-lives in human plasma.

It is one advantage of PEG to be able to be conjugated with a medicine which is especially difficult to be applied to human because of its toxicity and insolubility even though highly effective, in order to enhance the solubility of the PEG conjugated drug (PEG-Drug) and reduce it's toxicity.

The mPEG with high purity (>99%) can be obtained by the following two methods.

The classical and general method of preparing mPEG is to react ethylene oxide with methanol in the presence of alkaline earth metal catalysts (Na, K, etc).

U.S. Pat. No. 6,455,639 B1 describes the synthesis of mPEG with at least 99% purity. According to the description, the way to prepare mPEG with high purity is to minimize the moisture included in the reactor and methanol before the polymerization and to minimize sub-reaction possibly caused during the reaction. However, such problems have not been solved therein that a huge amount of organic solvent (such as toluene) is required to eliminate the moisture and re-treatment is impossible when the byproduct (PEG) of the sub-reaction or the level of PDI increases.

Another way to prepare mPEG with high purity is to perform polymerization of mPEG and then separate and purify the included PEG therefrom. Selisko and Ehwald presented that mPEG has been separated and purified with high purity by using gel permeation chromatography (GPC) (Barbara Selisko and Rudolf Ehwald, Journal of Chromatography, 641 (1993) 71~79). This method, however, is only available when the distribution of molecular weight is significantly different between mPEG and PEG, suggesting that this method is difficult to be commercialized.

U.S. Pat. No. 5,298,410 describes that mPEG-succinate is first synthesized and then mPEG with high purity is separated and purified in the presence of methylenechloride by using Dowex50*8-100H resin. However, mPEG-succinate used in the description comprises ester bond which is highly sensitive to water, so that disintegration might be caused during the separation. A requirement of a huge amount of organic solvent is another problem to be commercialized.

DISCLOSURE

Technical Problem

It is an object of the present invention, to overcome the above mentioned problems, to provide a preparing method of mPEG with high purity which is stable in aqueous solution by water.

It is another object of the present invention to provide a preparing method of mPEG derivatives with high purity of 99% at least.

Technical Solution

The present invention provides a preparing method of mPEG with high purity and derivatives thereof by reacting and purifying the conventionally prepared mPEG containing impurities.

Particularly, the conventional mPEG with low purity is reacted to separate the following intermediates with high purity, which are mPEG-acetic acid represented by formula 1 and mPEG-phthalate represented by formula 2. And at last, mPEG with high purity of 99% at least is prepared from the intermediates, whose molecular weight is 350~100,000 and the distribution of molecular weight is up to 1.05.

[Formula 1]

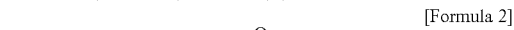

[Formula 2]

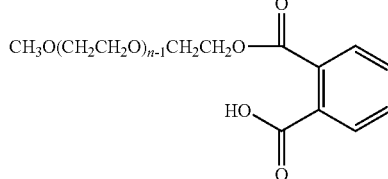

Any conventional mPEG having up to 98% of purity can be used in the present invention. According to the present invention, any mPEG with up to 98% of purity can be reacted and purified and at last turns out to be highly purified mPEG with at least 99% of purity.

Best Mode

Hereinafter, the embodiments of the present invention will be described in detail. The definitions of terms and techniques of the invention are well known to those in the art, so that the definitions are not described herein.

First, a preparing method of mPEG with high purity via mPEG-acetic acid synthesis is as follows.

mPEG is reacted with t-butylbromoacetate to give mPEG-acetic acid, followed by column chromatography to purify the product at least 99%. The highly purified mPEG-acetate is substituted with alkyl ester group by using alcohol, and the alkyl ester group is converted by using a reducing agent to give mPEG of the invention with high purity.

The above method is described in more detail hereinafter.

1) m-PEG is added to toluene, and some of the toluene is eliminated by atmospheric distillation;

2) The solution is cooled down at room temperature, to which alcoxide is added in the presence of alcohol;

3) t-butyl bromoacetate is added to the solution, followed by reaction, and then a amount of NaOH is added to the solution, followed by reflux;
4) Neutralization is performed and the product is extracted by methylenechloride; and
5) The extract is crystallized in a solvent to give mPEG-acetate with high purity.

In step 5) the solvent used for the crystallization is one or more selected from a group consisting of ethylether, methyl-t-butylether, heptane, hexane, isopropylalcohol and acrylonitrile, and a 'solvent' described hereinafter in the present invention also means one or more selected from the group.

It is more preferred that mPEG-acetic acid is prepared in aqueous solution and purified by column chromatography to increase the level of purity. Anion exchange resin is preferably used as a stationary phase of column chromatography, for example Q-sepharoseFF (Amersham Biosciences) or QAE-Toyopearl (TOSHO) is preferably used. It is also preferred that a moving phase is 0.1~50 mM $NH_4.HCO_3$ solution. So, the purification with column chromatography under the above condition results in mPEG-acetic acid with at least 99% of purity.

Then, mPEG-alkylester with high purity is prepared by the following steps.
6) The mPEG-acetic acid with high purity prepared above is reacted with alcohol in the presence of an acid catalyst;
7) Methylenechloride is added to the reactant, followed by phase separation;
8) The reactant is crystallized using a solvent to give mPEG-alkylester with at least 99% of purity. Hereinabove, the alcohol is preferably one of lower alcohols such as methanol, ethanol and propanol, but not always limited thereto.

Then, mPEG-alkylester is converted by using a reducing agent to give mPEG with high purity, according to the following steps.
9) The mPEG-alkylester is reacted in the presence of a reducing agent;
10) The reactant is cooled down and then NaOH solution is added thereto to terminate the reaction;
11) An inorganic acid is added to the reactant to prepare an acidic solution;
12) The reactant is extracted by methylenechloride and crystallized using a solvent to give mPEG with at least 99% of purity and the distribution of molecular weight of up to 1.05.

$NaBH_4$ is preferably used as a reducing agent in the present invention, but not always limited thereto. In fact, any reducing agent that is generally used to convert ester into alcohol can be used.

Hereinafter, processes of preparing and purifying mPEG-phthalate, which is an intermediate to prepare mPEG with high purity, are described.

First, mPEG is reacted with phthalic anhydride to give mPEG-phthalate. The mPEG-phthalate is purified by column chromatography, increasing the purity to at least 99%. The mPEG-phthalate with high purity prepared above is reacted with NaOH solution, followed by hydrolysis, resulting in mPEG with high purity.

The above processes are described in more detail as follows;
1) mPEG is added to toluene, followed by atmospheric distillation to eliminate moisture;
2) The reactant is cooled down at room temperature, to which alcoxide is added in the presence of an alcohol solvent;
3) Phthalic anhydride is added to the solution to induce reaction;
4) The reactant is neutralized and extracted with methylenechloride;
5) The methylenechloride layer is washed;
6) A solvent is added to the methylenechloride layer, followed by crystallization;
7) The crystallized product is prepared in aqueous solution phase and purified by column chromatography to give mPEG-phthalate with at least 99% of purity.

As explained above, mPEG-phthalate is prepared in aqueous solution phase and purified by column chromatography to increase the purity. At this time, the stationary phase of the column chromatography is preferably anionic exchange resin, for example Q-sepharoseFF (Amersham Bioscience) and QAE-Toyopeal (TOSHO), and the moving phase is preferably 0.1~50 mM $NH_4.HCO_3$ solution. As a result, mPEG-phthalate with at least 99% of purity is prepared.

The steps of preparing mPEG with high purity from the above mPEG-phthalate are as follows.
8) De-esterification of the mPEG-phthalate is performed in the presence of a base;
9) The reactant is extracted with methylenechloride;
10) A solvent is added to the methylenechloride layer, followed by crystallization to give mPEG with at least 99% of purity.

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1 mPEG separation from mPEG-acetic acid
1) Synthesis of mPEG(20K)-acetic acid (Step 1)
To 1280 L of toluene was added 100 kg of mPEG (20K, 95%) at room temperature, then the temperature was raised to 110° C., followed by atmospheric distillation to eliminate 300 L of toluene. The reaction solution was cooled down at room temperature and then 842 g of potassium t-butoxide and 13.9 kg of butanol were added thereto in the presence of nitrogen. One hour later, 2.8 kg of t-butylbromoacetate was added to the reaction solution, followed by reaction for three hours. Then, 1000 kg of 4% NaOH was added to the solution to separate layers, followed by reflux at 100° C. for one hour. pH of the solution was adjusted to 2~2.5 with HCl. To the solution was added 665 kg of methylenechloride, followed by stirring for one hour to separate layers. The methylenechloride layer was treated with $MgSO_4$, followed by crystallization with 665 L of ethylether to give mPEG-acetic acid.

As a result, the yield was 95 kg (95%) and the purity was >99.9% (HPLC). $^1$H-NMR(200 MHz, $CDCl_3$, ppm): 3.39(s, $CH_3O$—), 3.25~4.0(m, PEG backbone), 4.17(s,—$CH_2$—CO—)

2) Purification of pure mPEG(20K)-acetic acid (Step 2)
2% mPEG(20K)-acetic acid solution (4.7 m$^3$) prepared in the above step 1) was applied onto the separation column packed with 200 L of Q Sepharose FF, more precisely the solution was dropped by using a dosing pump nine times. After washing with distilled water and 5 C.V (column volume) of 0.2 mM $NH_4HCO_3$, 10 m$^3$ of mPEG-acetic acid with high purity was obtained. The reactant was acidified by HCl (pH=2~2.5) and then extracted with 3 m$^3$ of methylenechloride. The reaction product was treated with $MgSO_4$, followed by crystallization with 3 m$^3$ of ethylether to give mPEG-acetic acid. As a result, the yield was 90% (85.2 kg) and the purity was >99.9% (HPLC).

¹H-NMR(200 MHZ, CDCl₃, ppm): 3.39(s, CH₃O—), 3.25~4.0 (m, PEG backbone), 4.17(s, —CH₂—CO—)

3) Synthesis of mPEG(20K)-methylester (Step 3)

To 85.2 kg of mPEG-acetate purified in the above step 2) were added 710 L of MeOH and 2.1 kg of sulfuric acid, followed by reaction for one hour. 710 L of methylenechloride was added thereto, followed by washing with 500 L of distilled water three times. The methylenechloride solution was concentrated into 250 L and crystallized with 2.5 m³ of ethylether, followed by drying. As a result, the yield was 95% (80.9 kg) and the purity was >99.5% (HPLC).

¹H-NMR(200 MHz, CDCl₃, ppm): 3.39(s, CH₃O—), 3.25~4.0 (m, PEG backbone), 4.2(s, —CH₂—C(O)OCH₃)

4) Synthesis of pure mPEG(20K) (Step 4)

80.9 kg of mPEG(20K)-methylester was dissolved in 350 L of methylenechloride. To the reaction solution was added 350 L of methanol. 3.9 Kg (30 eq.) of NaBH₄ was added to the reaction solution, followed by stirring for 2 hours. After one hour reaction at 45~50° C., the reaction solution was cooled down. 100 kg of 4% NaOH was added and the temperature of the reaction solution was raised to 75~80° C. slowly, followed by stirring for one hour. After cooling down, pH was adjusted with HCl to 2~2.5. Extraction was performed three times by using 100 L of methylenechloride solution, followed by MgSO₄ treatment. The methylenechloride solution was concentrated into 100 L, followed by crystallization with 10 m³ of ethylether. As a result, the yield was 95% (76.9 kg) and the purity was 99%(HPLC), and the PD was <1.05 (GPC).

¹H-NMR(200 MHz, CDCl₃, ppm): 3.39(s, 3H, CH₃O—), 3.25~4.20(m, 908H, PEG backbone)

EXAMPLE 2 mPEG separation from mPEG-phthalate

1) Synthesis of mPEG(20K)-phthalate (Step 1)

To 450 L of toluene was added 40 kg of mPEG(20K), followed by atmospheric distillation to eliminate 120~140 L of toluene. The reaction solution was cooled down to 40° C. The prepared mixture (potassium tert-butoxide 1.12 kg (5 eq)+t-butanol 10.5 kg+toluene 10 kg) was added thereto. After stirring for one hour, 3 kg (10 eq) of phthalic anhydride was added, followed by reaction for three hours. The internal temperature was cooled down to 20° C. To the reaction solution was added 270 kg of HCl solution (pH 3), followed by stirring for 30 minutes to separate layers. After the layer separation, 180 kg of methylenechloride was added twice for extraction. The extract was washed once. To the extract was added 12 kg of MgSO₄, followed by stirring for 10~20 minutes and filtering. The methylenechloride solution was concentrated into 180 L and crystallized with 1.8 m³ of isopropylalcohol. As a result, the yield was 95% (43 kg) and the conversion rate was >99% (HPLC).

¹H-NMR(200 MHz, CDCl₃, ppm): 3.39(s, CH₃O—), 3.25~4.20(m, PEG backbone), 4.47(s, —CH₂—CO—)

2) Purification of pure mPEG(20K)-phthalate (Step 2)

43 kg of mPEG(20K)-phthalate was purified by the same manner as described in the above step 2 of Example 1. As a result, the yield was 90% (38.7 kg) and the purity was >99.9% (HPLC).

¹H-NMR(200 MHz, CDCl₃, ppm): 3.39(s, CH₃O—), 3.25~4.20(m, PEG backbone), 4.47(s, —CH₂—CO—)

3) Synthesis of pure mPEG(20K) (Step 3)

38.7 kg of mPEG(20K)-phthalate was added to 100 L of 4% NaOH, followed by reflux for one hour. The reaction solution was cooled down at room temperature. Extraction was performed with 50 L of methylenechloride twice, followed by MgSO₄ treatment. The extracted methylenechloride layer was crystallized with 500 L of isopropylalcohol. As a result, the yield was 95% (36.8 kg) and the purity was >99% (HPLC).

¹H-NMR(200 MHz, CDCl₃, ppm): 3.39(s, 3H, CH₃O—), 3.25~4.20(m, 908H, PEG backbone)

INDUSTRIAL APPLICABILITY

As explained hereinbefore, according to the preparing method of methoxypolyethyleneglycol (mPEG) of the present invention, mPEG with high purity (at least 99%), which is very stable in aqueous solution, can be prepared by using water.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A preparing method of methoxypolyethyleneglycol-phthalate with at least 99% of purity, which comprises the following steps:
   1) Adding methoxypolyethyleneglycol to toluene and eliminating some of the toluene by atmospheric distillation;
   2) Adding metallic alcoxide in the presence of alcohol after cooling the reactant at room temperature;
   3) Adding phthalic anhydride to the reaction solution;
   4) Extracting with methylenechloride after neutralizing the reactant;
   5) Washing the methylenechloride layer;
   6) Crystallizing the methylenechloride layer by adding a solvent; and
   7) Purifying the crystallized product by column chromatography.

2. The preparing method of methoxypolyethyleneglycol-phthalate with at least 99% of purity according to claim 1, wherein the stationary phase of the column chromatography is anion exchange resin and the moving phase is 0.1 - 50 mM NH₄.HCO₃ solution.

3. A preparing method of methoxypolyethyleneglycol with at least 99% of purity and up to 1.05 of molecular weight distribution, which comprises the following steps:
   8) De-esterifying the methoxypolyethyleneglycol-phthalate prepared according to the method of claim 1 in the presence of a base;
   9) Extracting the reactant with methylenechloride; and
   10) Crystallizing the methylenechloride layer by adding a solvent.

4. The preparing method of methoxvnolyethyleneglycol-phthalate with at least 99% of purity and up to 1.05 of molecular weight distribution according to claim 1 wherein the solvent used for the crystallization is one or more selected from a group consisting of ethylether, methyl-t-butylether, heptane, hexane, isopropylalcohol and acrylonitrile.

5. A preparing method of methoxypolyethyleneglycol with at least 99% of purity and up to 1.05 of molecular weight distribution, which comprises the following steps:
   11) De-esterifying the methoxypolyethyleneglycol-phthalate prepared according to the method of claim 2 in the presence of a base;
   12) Extracting the reactant with methylenechloride; and
   13) Crystallizing the methylenechloride layer by adding a solvent.

6. The preparing method of methoxypolyethyleneglycol with at least 99% of purity and up to 1.05 of molecular weight distribution according to claim 3, wherein the solvent used for the crystallization is one or more selected from a group consisting of ethylether, methyl-t-butylether, heptane, hexane, isopropylalcohol and acrylonitrile.

* * * * *